US012000205B2

(12) United States Patent
Borovitz-Linda et al.

(10) Patent No.: US 12,000,205 B2
(45) Date of Patent: Jun. 4, 2024

(54) FOLDABLE DRAFT PREVENTION DEVICE

(71) Applicant: Universal Screen Arts, Inc., Hudson, OH (US)

(72) Inventors: Sheri Borovitz-Linda, Hudson, OH (US); Adam Severin, Hudson, OH (US)

(73) Assignee: Universal Screen Arts, Inc., Hudson, OH (US)

( * ) Notice: Subject to any disclaimer, the term of this patent is extended or adjusted under 35 U.S.C. 154(b) by 55 days.

(21) Appl. No.: 17/396,098

(22) Filed: Aug. 6, 2021

(65) Prior Publication Data

US 2022/0042371 A1 Feb. 10, 2022

Related U.S. Application Data

(60) Provisional application No. 63/061,983, filed on Aug. 6, 2020.

(51) Int. Cl.
*E06B 7/23* (2006.01)
*E06B 7/18* (2006.01)

(52) U.S. Cl.
CPC .............. *E06B 7/2316* (2013.01); *E06B 7/18* (2013.01)

(58) Field of Classification Search
CPC ................................. E06B 7/2316; E06B 7/26
See application file for complete search history.

(56) References Cited

U.S. PATENT DOCUMENTS 2,798,261 A * 7/1957 Greig ........................ E06B 3/88 52/800.13
4,691,478 A * 9/1987 Lorg ..................... E06B 7/2316 49/499.1
4,765,094 A * 8/1988 Gemmell .............. E06B 7/2316 49/58
5,475,948 A * 12/1995 Parke .................... E06B 7/2316 49/470
D371,600 S * 7/1996 Henry ........................... D23/386
6,560,932 B2 * 5/2003 Heroux ................. E06B 7/2316 49/467
7,891,136 B1 * 2/2011 Heroux ................. E06B 7/2316 49/470
8,141,298 B2 * 3/2012 Heroux ................. E06B 7/2316 49/470
8,161,685 B2 4/2012 Salgado
(Continued)

FOREIGN PATENT DOCUMENTS

DE 102007003905 A1 8/2007
DE 202013004376 U1 * 8/2013 ............... E06B 7/26
(Continued)

OTHER PUBLICATIONS https://web.archive.org/web/20170606215405/https://www.newpig.com/absorbent-socks-booms/c/102.*

*Primary Examiner* — Marcus Menezes
(74) *Attorney, Agent, or Firm* — Lippes Mathias LLP

(57) ABSTRACT

A draft protector for a double door system has a longitudinally extending body having a first portion, a second portion, and a foldable central connecting portion disposed between the first and second portion. The first portion is positioned adjacent a first door and the second portion is positioned adjacent a second door, and either the first or second portion is folded over and in parallel alignment with the first or second portion when the first or second door is in an open position.

13 Claims, 3 Drawing Sheets

(56) References Cited

U.S. PATENT DOCUMENTS

| | | | | | |
|---|---|---|---|---|---|
| 8,701,350 | B2 * | 4/2014 | Vulpitta | E06B 7/26 | 49/470 |
| 8,733,019 | B2 * | 5/2014 | Vulpitta | E06B 7/2316 | 49/70 |
| 10,294,715 | B1 * | 5/2019 | Hertel | E06B 9/00 | |
| 10,895,104 | B1 * | 1/2021 | Hertel | E06B 7/23 | |
| 2003/0126826 | A1 * | 7/2003 | Marshall | E04G 21/30 | 52/716.2 |
| 2006/0032144 | A1 * | 2/2006 | Heroux | E06B 7/2316 | 49/469 |
| 2010/0192468 | A1 * | 8/2010 | Chubb | E06B 7/2312 | 49/404 |
| 2011/0283627 | A1 * | 11/2011 | Shaw | E06B 7/2316 | 49/478.1 |
| 2012/0222361 | A1 * | 9/2012 | Farucci | E06B 7/2316 | 49/475.1 |
| 2013/0276376 | A1 * | 10/2013 | Gilbert | E06B 7/28 | 49/504 |
| 2014/0190099 | A1 * | 7/2014 | Hopkins, II | E06B 7/2316 | 52/204.5 |
| 2014/0193203 | A1 * | 7/2014 | Richardson | E06B 9/06 | 405/116 |
| 2022/0282563 | A1 * | 9/2022 | Koennecke | E06B 7/2312 | |

FOREIGN PATENT DOCUMENTS

| | | | | | |
|---|---|---|---|---|---|
| EP | 3181796 | A1 | | 6/2017 | |
| FR | 2675532 | A1 | * | 10/1992 | E06B 7/2314 |
| FR | 2675532 | A1 | | 10/1992 | |
| GB | 1079667 | A | | 8/1967 | |
| GB | 2109447 | A | * | 6/1983 | E06B 7/2316 |
| GB | 2109447 | A | | 6/1983 | |
| GB | 2276410 | A | * | 9/1994 | E06B 7/26 |
| WO | WO 2006/020771 | A2 | | 2/2006 | |

* cited by examiner

FOLDABLE DRAFT PREVENTION DEVICE

This application claims priority from Provisional Application Ser. No. 63/061,983 filed on Aug. 6, 2020, the entirety of which is hereby incorporated by reference.

BACKGROUND OF THE DISCLOSURE

The present disclosure relates to a device to prevent drafts from entering a structure. It finds particular application in conjunction with door systems and preventing drafting air, bugs, dust, and unwanted odors from entering a building or residence originating from the outside environment and further assisting in the temperature regulation of the structure. However, it is to be appreciated that the present exemplary embodiment is also amenable to other like applications.

Sliding and rotating door systems are installed in many residential and commercial structures as a way of providing access into and out of the structure. Door systems of this type are usually double sliding door systems wherein each door is provided with at least one glass pane closed within a metal or plastic border. Generally, one door is fixed and the other is slidable or pivotable between open and closed positions within the frame of the door system. That is, the door includes a frame including a plurality of adjacent tracks where each track is associated with at least one door that is slidably attached within the frame. The door system provides access to outside by sliding a door along the track to an open position. Alternatively, both doors can be pivoted open and closed such as in a French door system.

The base of the door system, where each door contacts the track or frame, is susceptible to gaps and allows for unwanted air (i.e., drafts), bugs, or the like, originating from the outside environment to enter the structure. Drafting air, especially in the wintertime, may contribute to a drop in temperature within the structure leading to increased heating and energy costs and discomfort.

Some draft stopping systems require the device to be completely removed to allow a portion of the swinging or sliding door to be opened to allow ingress or egress through the door. This requires removal and replacement of the draft stopping system whenever ingress or egress through the door is desired. Thus, it is desirable to provide a draft stopper that is foldable and may be placed about a sliding or swinging door system to prevent drafts and unwanted outside annoyances from entering the structure while being easily moved out of the way to allow one to freely open and close the sliding door without completely removing the draft stopper.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with a preferred embodiment of the disclosure, a draft stopper for a door system includes a longitudinally extending body having a first portion, a second portion, and a central portion forming an attachment portion which provides a pivoting or hinged connection between the first and second portions. The second portion is rotatable or pivotal between engaged and unengaged positions, where the second portion is positioned in front of the door and then rotated away from the door. The second portion can be moved to a position parallel to the first portion.

In accordance with another aspect of the disclosure, both first and second portions are positioned adjacent first and second doors on the same side of the door system.

In accordance with another aspect of the disclosure, the first and second portions do not move with the doors between open and closed positions.

In accordance with another embodiment of the disclosure, a foldable draft protector for a two door sliding door system has a longitudinally extending body having a first portion, a second portion and a foldable central portion disposed between the first and second portions, wherein the first portion is positioned facing a portion of the door system and a first door of the two door sliding door system and the second portion is configured to substantially fill a second portion of the sliding door system in the engaged position and abuts a second door of the sliding door system; and each of the first and second portions are positioned on a same side of said sliding door system in said engaged position when said first door and said second door are in a closed position.

In accordance with another preferred embodiment of the disclosure, described is a method of preventing a draft in a door system comprising: providing a draft protection device having a longitudinally extending body having a first portion, a second portion, and a central attachment portion, rotatable between engaged and unengaged positions, configuring the longitudinally extending stopper to substantially fill a recess of the door system in the engaged position and abut at least one door of the door system.

Still other aspects of the disclosure will become apparent upon a reading and understanding of the following detailed description.

BRIEF DESCRIPTION OF THE DRAWINGS

The following description and drawings set forth certain illustrative implementations of the disclosure in detail. The illustrated examples, however, are not exhaustive of the many possible embodiments of the disclosure.

DETAILED DESCRIPTION OF THE DISCLOSURE

Figure 1:
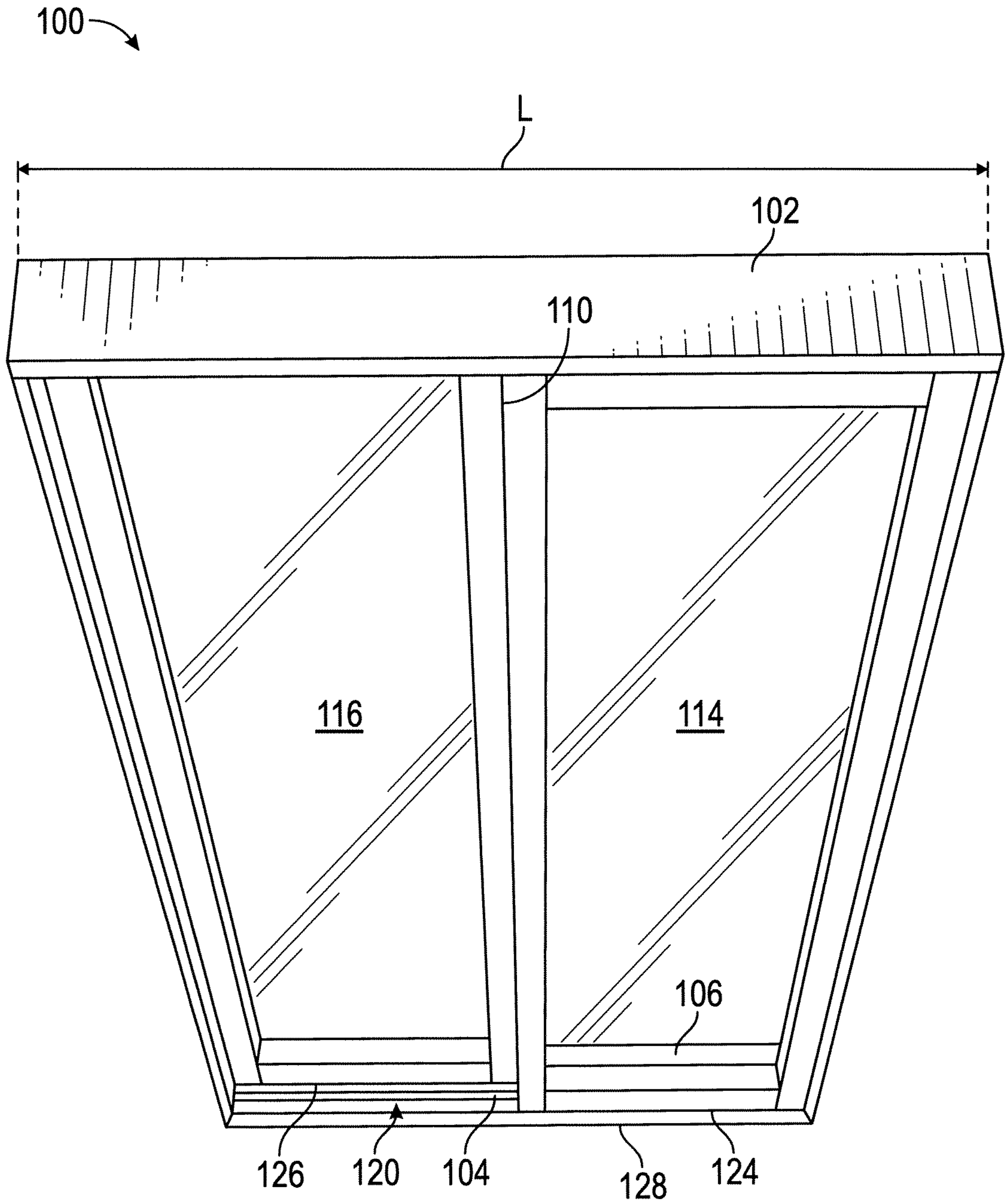
FIG. 1 PRIOR ART
FIG. 1 is a perspective view of a typical existing sliding door system.
Figure 2:
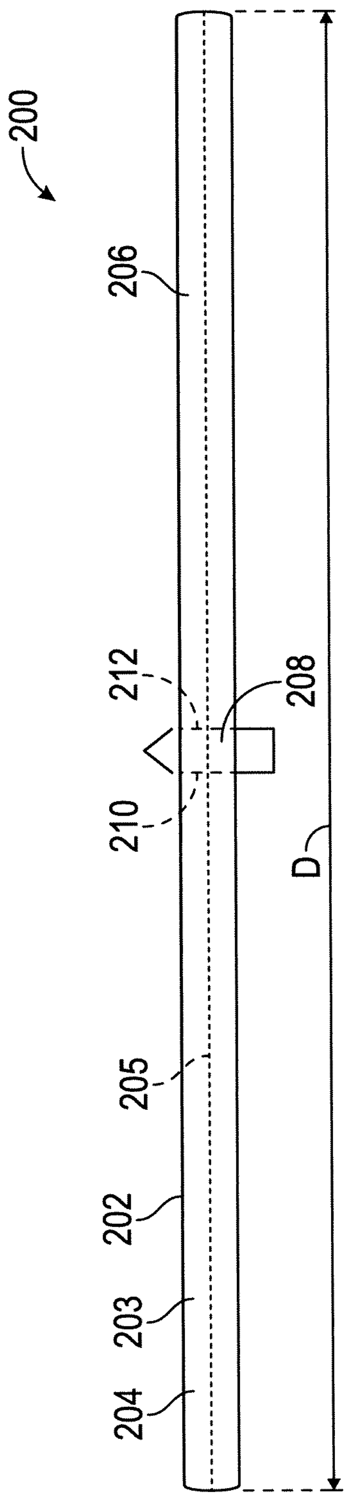
FIG. 2 is a top plan view of a foldable draft stopper in accordance with the preferred embodiment of the present disclosure.
Figure 3:
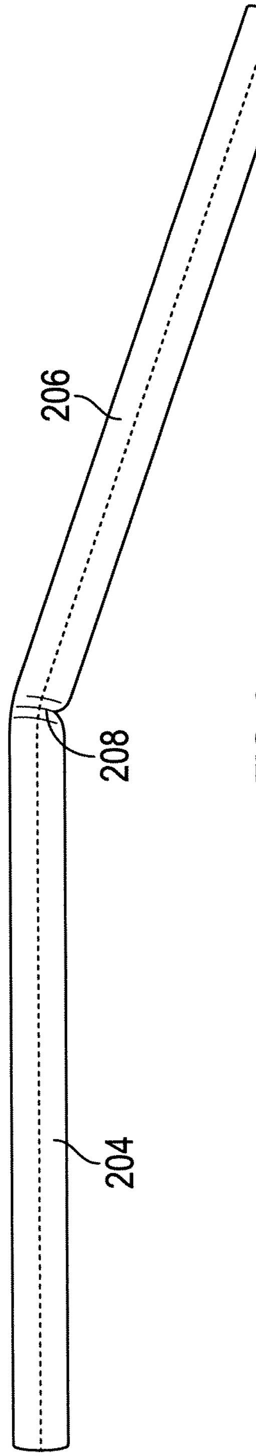
FIG. 3 is a top plan view of a foldable draft stopper in a partially folded position in accordance with the preferred embodiment of the present disclosure.
Figure 4:
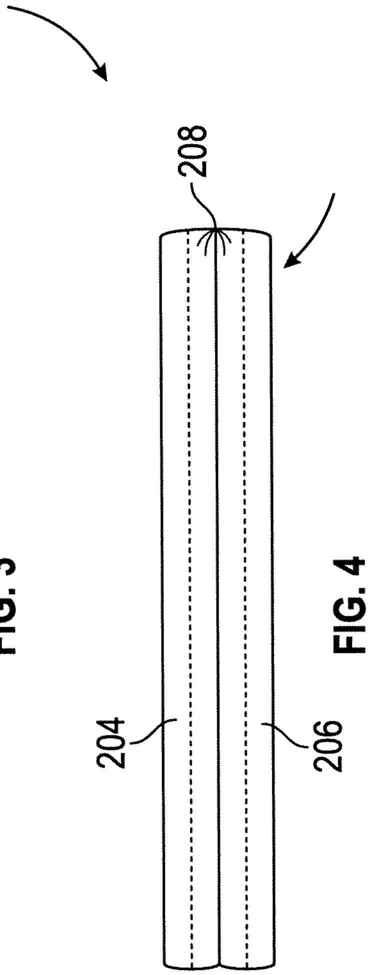
FIG. 4 is a top plan view of a foldable draft stopper in a completely folded position in accordance with the preferred embodiment of the present disclosure.

A more complete understanding of the articles/devices, processes, and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms “a”, “an”, and “the” include plural referents unless the context clearly dictates otherwise.

As used in the specification and in the claims, the term “comprising” may include the embodiments “consisting of” and “consisting essentially of.” The terms “comprise(s),” “include(s),” “having,” “has,” “can,” “contain(s),” and variants thereof, as used herein, are intended to be open-ended transitional phrases, terms, or words that require the presence of the named ingredients/steps and permit the presence of other ingredients/steps. However, such description should be construed as also describing compositions or processes as “consisting of” and “consisting essentially of” the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

FIG. 1 illustrates a typical existing sliding door system 100 often found installed in a structure. The system 100, includes a frame 102, an interior facing track 104, and an exterior facing track 106. The tracks 104 and 106 are parallel and may substantially extend along the entire length L of the frame 102. These door systems often include a first door 114 associated with the interior track 104 and a second door 116 associated with the exterior track 106. The system 100 of FIG. 1 illustrates the first door 114 in a closed position. That is, the first door 114 and second door 116 are arranged such that the combination of the offset doors extend along the length L of the door frame 102. The doors 114 and 116 may overlap at a centralized position 110 of the frame 102 and include a vertically extending seal (not shown) to prevent drafts, debris, and the like from entering the structure between a gap created between the overlapping doors.

The first door 114 is configured to slidably move along the track 104 of the frame 102 from a closed position (as shown in FIG. 1) to an open position (not shown). In the open position, the first door 114, substantially overlaps the position of the second door 116 and provides an open space located where the first door 114 was positioned in the closed state. The open space allows for an exchange between the outside environment and interior environment of the structure allowing for a person to exit or enter the structure. In some systems, the second door 116 is fixed, meaning that it does not slide with respect to positions along its associated track 106. In other systems, the second door 116 is also configured to slidably move along its associated track 106.

It is to be appreciated, that a recess 120 is created due to the offset nature of the first door 114 and second door 116 in the closed position. That is, a portion of the interior track 104 within the recess 108 is unoccupied by the door 114. Drafting air, dust, odors, and pests may enter the structure through gaps between the bottom 124 of first door 114 and its associated track 104 and through gaps between the bottom 126 of second door 116 and its associated track 106 adjacent to the recess 120 formed along door frame base 128.

FIGS. 2-7 illustrate a preferred embodiment of a draft stopper 200 of the present disclosure. Of course, variations to the draft stopper are contemplated by the disclosure. The foldable door draft stopper 200 is compatible with the typical sliding door systems illustrated in FIG. 1. Of course, the foldable draft stopper can be adapted for use with swinging or rotatable doors or French door systems as well. The draft stopper 200 preferably includes a longitudinally extending body 202 with a first portion 204, a second portion 206, and a central connecting portion 208 which may be hollow. The longitudinally extending body 202 has a length D extending from the first end 204 to the second end 206. In some embodiments, the length D of the longitudinally body can be greater than the length L of the door system 100. In other embodiments, the length D of the longitudinally body is about equal to the length L of the door system 100. In some embodiments, the length L of the body 202 is from about 65 to about 75 inches. In more particular embodiments, the length L of the body 202 is about 71.5 inches. Thus, length D can vary from 65 to over 75 inches or other dimensions contemplated by the disclosure.

The longitudinally extending body 202 preferably includes an exterior body casing 203 configured to contain at least one material 205 therein. That is, the body casing 203 is a bag like structure which is filled with at least one material and then closed. In some embodiments, the body casing 203 is composed of a fabric. In other embodiments, the body casing 203 is composed of a waterproof material. In other embodiments, the body casing 203 is composed of a combination of materials. The body casing 203 defines the shape of the longitudinally extending body 202. In some embodiments, the body casing 203 is substantially cylindrical in shape.

The hollow body casing 203 may also contain at least one thermal insulating material 205. Insulating materials include, but are not limited to fiberglass, wool, cellulose, natural fibers, polystyrene, polyurethane, polyester, cotton, foams, and the like. In some embodiments, the insulating material is composed of polyester.

The body casing 203 may contain at least one weighted material 205. The weighted material is provided to the body 202 in order to provide resistance of the body 202 to motion. That is, the draft stopper 200 due to its weighted materials stays in place along the edge of a door system and does not move due to incoming drafting air. Weighted materials include but are not limited to sand, gravel, stones and the like, metal beads such as lead, steel, iron, brass, and the like. In some embodiments, the weighted material is sealed within a sack and then the sack is placed within the body casing 203 before sealing the body casing 203. In some preferred embodiments, the body casing 203 contains a combination of insulating and weighted materials.

The connection portion 208 forms an empty space between first portion 204 and second portion 206 which enables the stopper to easily fold in half. (See FIGS. 2-4).

Preferably, first and second portions 204 and 206 are sewn or otherwise sealed on inside positions 210, 212 to keep the stuffing 205 inside the first and second portions and from entering the hollow central portion 208.

Example

Figure 5:
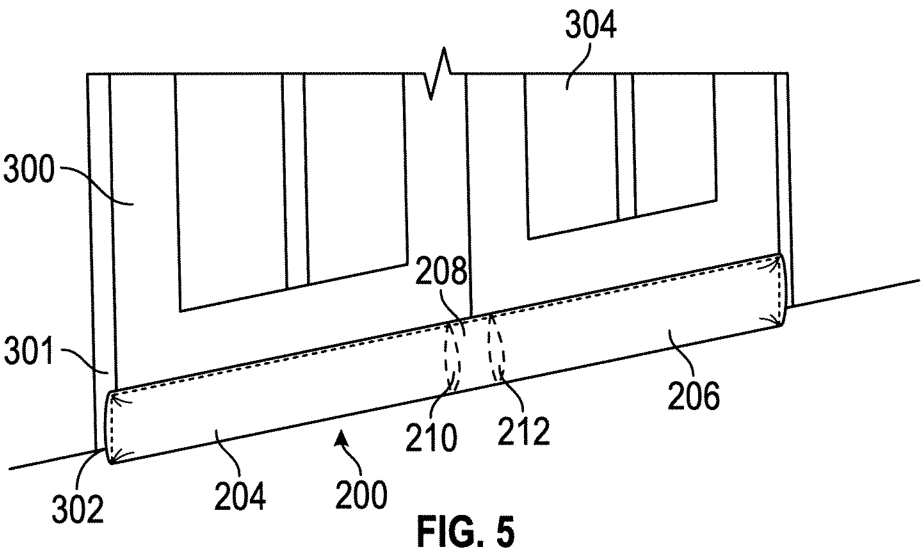
FIG. 5 is a perspective view of the foldable draft stopper of the preferred embodiment of the present disclosure positioned adjacent a door system.
Figure 6:
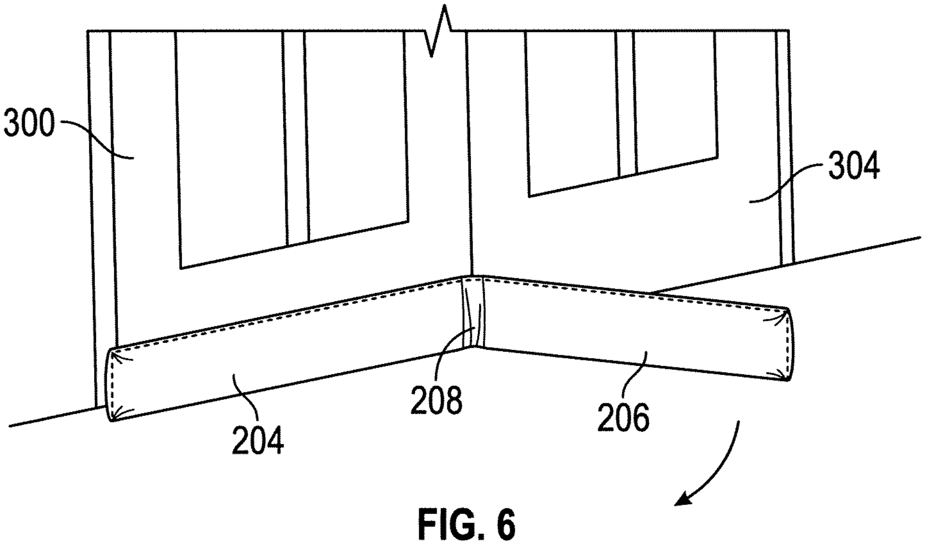
FIG. 6 is a perspective view of the foldable draft stopper of FIG. 5 in a partially folded position.
Figure 7:
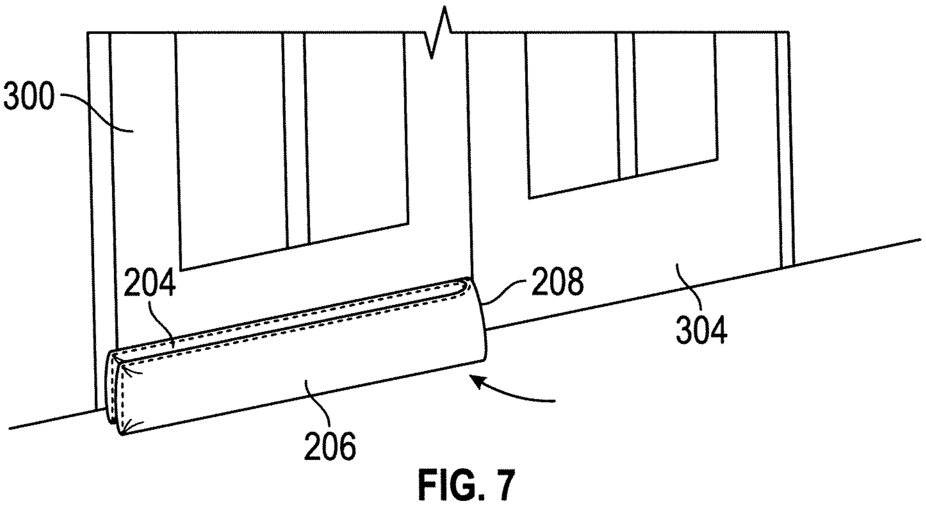
FIG. 7 is a perspective view of the foldable draft stopper of FIG. 5 in a completely folded position.

Referring now to FIGS. 5-7, the foldable draft stopper 200 being used with a door system having a first door 300 and a second door 304 in accordance with the preferred embodiment of the disclosure is shown.

The foldable draft stopper prevents unwanted debris, drafts, etc. from entering a residence or building via gaps about a base of the door.

FIG. 5 shows the foldable draft stopper positioned in a fully engaged, longitudinally position along the bottom edge of a door frame 301 with the first and second portions 204, 206 substantially filling the bottom edge 302 of the door frame 301. First portion 204 is positioned adjacent an abutting first door 300, while second portion 206 is positioned adjacent an abutting second door 304. Both first and second portions 204, 206 are positioned on the same side of door frame 301 in an engaged position when the doors are closed.

FIG. 6 shows the second portion 206 partially folded away from the door frame 301 about central portion 208, while FIG. 7 shows the second portion 206 completely folded over and in parallel alignment with the first portion 204, thereby allowing door 304 to be rotated or slid to an open position to allow ingress and egress through door 304. First portion 204 remains adjacent to the first door 300 when the second door 304 is slid or rotated open. Neither first portion 204 and second portion 206 travel or move with either door while being opened or closed.

The exemplary embodiment has been described with reference to the preferred embodiment. Obviously, modifications and alterations will occur to others upon reading and understanding the preceding detailed description. It is intended that the exemplary embodiment be construed as including all such modifications and alterations insofar as they come within the scope of the above disclosure or the equivalents thereof.

The invention claimed is:

1. A draft protector for a double door system comprising:

a longitudinally extending body comprising: a first portion extending along a longitudinal axis of said longitudinally extending body, a second portion extending along said longitudinal axis of said longitudinally extending body, said second portion is substantially the same length as said first portion, a foldable central connecting portion disposed halfway between the first and second portions and positioned along said longitudinal axis of said longitudinally extending body, wherein said foldable central connecting portion is sealed by a first sealing connection between said foldable central connecting portion and said first portion and extending transverse to the longitudinal axis of said longitudinally extending body along an entire height of said foldable central connecting portion and said first portion and by a second sealing connection between said foldable central connecting portion and said second portion and extending transverse to the longitudinal axis of said longitudinally extending body an entire height of said foldable central connecting portion and said second portion;

wherein the first portion is positioned adjacent and parallel to a first door and the second portion is positioned adjacent and parallel to a second door wherein said first portion and second portion extend along the same longitudinal axis extending through said first portion and said second portion;

wherein one of the first or second portion is folded at said foldable central connecting portion and is in parallel alignment with the other of the one of the first and second portion when the first or second door is in an open position.

2. The draft protector according to claim 1, wherein the first portion, second portion, and foldable central connecting portion are positioned on a same side of said double door system in an engaged position when said first door and said second door are in a closed position.

3. The draft protector according to claim 1, wherein the longitudinally extending body is substantially cylindrical in shape.

4. The draft protector according to claim 1, wherein the longitudinally extending body comprises a body casing configured to contain at least one filling material.

5. The draft protector according to claim 4, wherein the body casing is waterproof.

6. The draft protector according to claim 4, wherein the at least one filling material is polyester.

7. The draft protector according to claim 4, wherein the body casing is configured to contain at least one weight material.

8. The draft protector according to claim 7, wherein the weight material is gravel bags.

9. The draft protector according to claim 4, wherein the body casing comprises a fabric.

10. The draft protector according to claim 1, wherein the foldable central connecting portion forms an empty space between the first portion and the second portion.

11. The draft protector according to claim 1, wherein the foldable central connecting portion is hollow.

12. The draft protector according to claim 1, wherein the longitudinally extending body is about 71.5 inches long.

13. A method of preventing a draft in a double door system comprising:

providing a draft protection device having a longitudinally extending body having a first portion, a second portion substantially the same length as said first portion and positioned adjacent to and parallel to said first portion, and a foldable central connecting portion disposed halfway between the first and second portions, wherein said first portion, said second portion and said foldable central connecting portion each extends along a longitudinal axis of said longitudinally extending body, and wherein said foldable central connecting portion is sealed by a first sealing connection between said first portion and said foldable central connecting portion and extending transverse to the longitudinal axis of said longitudinally extending body along an entire height of said first portion and said foldable central connecting portion and a second sealing connection between said second portion and said foldable central connecting portion and extending transverse to the longitudinal axis of said longitudinally extending body along an entire height of said second portion and said foldable central connecting portion;

configuring said first portion to face a first door of said double door system along a length of the first door of said double door system;

configuring said foldable central connecting portion such that it is positioned between the first door and a second door of said double door system; and unfolding said second portion via said foldable central connecting portion to face the second door of said double door system along a length of the second door of said double door system such that the first portion, second portion, and the foldable central connecting portion are positioned along a single longitudinal axis on a same side of said sliding door system in an engaged position when said first door and second door are in a closed position.

* * * * *